United States Patent
Lee et al.

(10) Patent No.: US 10,883,432 B2
(45) Date of Patent: Jan. 5, 2021

(54) EXHAUST GAS PURIFICATION SYSTEM FOR VEHICLE AND METHOD OF CONTROLLING THE SAME

(71) Applicants: Hyundai Motor Company, Seoul (KR); Kia Motors Corporation, Seoul (KR)

(72) Inventors: Hyokyung Lee, Anyang-Si (KR); Chang Hwan Kim, Seongnam-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/698,144

(22) Filed: Nov. 27, 2019

(65) Prior Publication Data

US 2020/0386178 A1 Dec. 10, 2020

(30) Foreign Application Priority Data

Jun. 4, 2019 (KR) .................. 10-2019-0065783

(51) Int. Cl.
| | | |
|---|---|---|
| *F02D 41/02* | (2006.01) | |
| *F01N 3/10* | (2006.01) | |
| *F01N 3/20* | (2006.01) | |
| *F01N 13/00* | (2010.01) | |

(Continued)

(52) U.S. Cl.
CPC ..... *F02D 41/0235* (2013.01); *B01D 53/9477* (2013.01); *B01J 23/63* (2013.01); *F01N 3/101* (2013.01); *F01N 3/2066* (2013.01); *F01N 13/0097* (2014.06); *F02D 41/025* (2013.01); *B01D 2255/904* (2013.01); *F02D 2200/0802* (2013.01); *F02D 2200/501* (2013.01); *F02D 2200/502* (2013.01)

(58) Field of Classification Search
CPC .... F01N 3/101; F01N 3/2066; F01N 13/0097; F02D 41/0235; F02D 41/025; F02D 2200/0802; F02D 2200/501; F02D 2200/502
See application file for complete search history.

(56) References Cited

U.S. PATENT DOCUMENTS 4,454,846 A * 6/1984 Suzuki .................... F02D 41/08
123/680
7,290,387 B2 * 11/2007 Yoshioka .............. F02D 41/123
60/285

(Continued)

*Primary Examiner* — Audrey K Bradley
(74) *Attorney, Agent, or Firm* — Morgan, Lewis & Bockius LLP

(57) ABSTRACT

An exhaust gas purification system for vehicle provided on an exhaust pipe connected to an exhaust side of an engine for purifying an exhaust gas of the engine includes a housing mounted on the exhaust pipe, a front end catalyst incorporated in the housing to primarily purify the exhaust gas flowing into the housing through the front end portion of the housing, a rear end catalyst incorporated in the housing to secondarily purify the exhaust gas passing through the front end catalyst before the exhaust gas flows out to the rear end portion of the housing, and a controller connected to the exhaust pipe at a front end portion of the housing to control the concentration of unburned fuel contained in the exhaust gas according to temperature of exhaust gas flowing into the housing and speed of the vehicle.

19 Claims, 4 Drawing Sheets

(51) Int. Cl.
*B01D 53/94* (2006.01)
*B01J 23/63* (2006.01)

(56) References Cited

U.S. PATENT DOCUMENTS

| | | | |
|---|---|---|---|
| 2015/0361851 A1* | 12/2015 | Miyake | F01N 3/36 |
| | | | 422/111 |
| 2017/0080937 A1* | 3/2017 | Bevan | B60W 10/06 |
| 2019/0032585 A1* | 1/2019 | Kelly | F02B 39/10 |

\* cited by examiner

EXHAUST GAS PURIFICATION SYSTEM FOR VEHICLE AND METHOD OF CONTROLLING THE SAME

CROSS-REFERENCE TO RELATED APPLICATION

The present application claims priority to Korean Patent Application No. 10-2019-0065783 filed on Jun. 4, 2019, the entire contents of which is incorporated herein for all purposes by this reference.

BACKGROUND OF THE INVENTION

Field of the Invention

The present invention relates to an exhaust gas purification system for vehicle and method of controlling the same. More particularly, the present invention relates to an exhaust gas purification system for vehicle and method of controlling the same which can reduce pollutants in exhaust gas.

Description of Related Art

In general, to reduce carbon monoxide (CO), hydrocarbons (HC), particulate matter (PM), nitrogen oxides (NOx), etc., as a pollution material contained in an exhaust gas, an exhaust system of an engine includes an exhaust gas post-treatment device such as a diesel oxidation catalyst (DOC) device, a diesel particulate matter filter (DPF), a selective catalytic reduction (SCR) device, and a nitrogen oxide storage catalyst (Lean NOx Trap, LNT catalytic) device, etc.

However, applying these devices to gasoline engines leads to cost increases and inconvenience of maintenance and repair of the vehicle such as charging of the elements. Furthermore, in the high load region, the NOx purification performance may deteriorate due to the lack of ammonia (NH3). In the high load region of the lean burn gasoline engine, the NOx purification performance may be excessively deteriorated.

Recently, as a technique for eliminating such a problem and performing post-treatment of exhaust gas of a gasoline engine in accordance with the regulations of the environmentally friendly vehicle, three-way catalytic converter (TWC) configured to simultaneously remove carbon monoxide, nitrogen oxides, and hydrocarbons based on at least one catalyst of palladium (Pd), platinum (Pt), and rhodium (Rh)(mainly palladium or a combination of at least one of platinum and rhodium with palladium) has been developed and applied to the exhaust gas post-treatment system of gasoline engines.

However, the post-treatment of the exhaust gas using the three-way catalyst requires control to alternate the fuel lean and fuel rich conditions of the engine to oxidize carbon monoxide and hydrocarbons as well as reduce nitrogen oxides. When the engine is heated and the three-way catalyst is warmed up, the harmful components of exhaust gas including nitrogen oxides are removed to close to 100%, but there is a limit to removing nitrogen oxides in a cold state at the initial stage of engine startup. According to the experimental results, When the exhaust gas post-treatment apparatus using the conventional three-way catalyst in which the fuel lean and fuel rich conditions of the engine are periodically alternated is evaluated according to the criteria of FTP-75, the urban driving mode prescribed by the US Environmental Protection Agency, in the cold state at the initial stage of the engine start, it was found that 60% or more of the total nitrogen oxides contained in the exhaust gas was exhausted through the tail pipe without being removed. To satisfy the fuel efficiency regulation, which is one of the regulations on the environment friendliness of vehicles, a high efficiency engine applied to a vehicle is developed to lower the temperature of the exhaust gas, and a technology for purifying the exhaust gas at low temperature is further required.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an exhaust gas purification system for vehicle and method of controlling the same that can effectively remove nitrogen oxides in exhaust gas even in cold state at the beginning of engine startup.

An exhaust gas purification system for vehicle provided on an exhaust pipe connected to an exhaust side of an engine for purifying an exhaust gas of the engine according to an exemplary embodiment of the present invention includes a housing mounted on the exhaust pipe to receive the exhaust gas discharged from the engine and to exhaust the exhaust gas passed rearward thereof, a front end catalyst incorporated in the housing to primarily purify the exhaust gas flowing into the housing through the front end portion of the housing, a rear end catalyst incorporated in the housing to secondarily purify the exhaust gas passing through the front end catalyst before the exhaust gas flows out to the rear end portion of the housing, and a controller connected to the exhaust pipe at a front end portion of the housing to control the concentration of unburned fuel contained in the exhaust gas according to temperature of exhaust gas flowing into the housing and speed of the vehicle, wherein the controller performs lean control to control the concentration of the unburned fuel contained in the exhaust gas flowing into the housing to be fuel lean after start of the engine, and controls differently a leanness of the concentration of the unburned fuel contained in the exhaust gas according to temperature of the exhaust gas flowing into the housing and speed of the vehicle.

The front end catalyst may be a palladium (Pd) catalyst that oxidizes hydrocarbons and carbon monoxide and occludes nitrogen oxides.

The front end catalyst may be a Pd/CZO catalyst.

The rear end catalyst may be a rhodium catalyst for reducing nitrogen oxides.

The rear end catalyst may be a Rh/CZO catalyst.

The controller may be configured to control to terminate the lean control if the temperature of the exhaust gas is above a predetermined temperature or the speed of the vehicle is above a set speed.

The controller, if the temperature of the exhaust gas is less than the predetermined temperature, and the speed of the vehicle is less than the set speed, may control the air-fuel ratio of the unburned fuel contained in the exhaust gas flowing into the housing when the gear of the vehicle is in the neutral (N) state to less than 1.08.

The controller may be configured to control the air-fuel ratio of the unburned fuel contained in the exhaust gas flowing into the housing when the gear of the vehicle is in the driving (D) state to less than 1.05.

The predetermined temperature may be 450° C. or more and less than 500° C.

The set speed may be 3 km/h.

A method of controlling an exhaust gas purification system for vehicle including a housing mounted on the exhaust pipe to receive the exhaust gas discharged from the engine and to exhaust the exhaust gas passed rearward thereof, a front end catalyst primarily purifying the exhaust gas, a rear end catalyst secondarily purifying the exhaust gas passing through the front end portion catalyst, and a controller connected to the exhaust pipe at a front end portion of the housing to control the concentration of unburned fuel contained in the exhaust gas according to temperature of the exhaust gas flowing into the housing and speed of the vehicle according to an exemplary embodiment of the present invention includes starting the engine, performing, by the controller, lean control to control the concentration of the unburned fuel contained in the exhaust gas flowing into the housing to be fuel lean, determining whether the temperature of the exhaust gas flowing into the housing is lower than a predetermined temperature and the speed of the vehicle is lower than a set speed, determining, by the controller, a gear state of the vehicle if the temperature of the exhaust gas flowing into the housing is lower than the predetermined temperature and the speed of the vehicle is lower than the set speed, and controlling, by the controller, the air-fuel ratio of the unburned fuel contained in the exhaust gas flowing into the housing if the gear of the vehicle is in the neutral (N) state to less than 1.08.

The method of controlling an exhaust gas purification system for vehicle according to an exemplary embodiment of the present invention may further include controlling, by the controller, the air-fuel ratio of the unburned fuel contained in the exhaust gas flowing into the housing when the gear of the vehicle is in the driving (D) state to less than 1.05.

The method of controlling an exhaust gas purification system for vehicle according to an exemplary embodiment of the present invention may further include controlling to terminate the lean control if the temperature of the exhaust gas inflowing into the housing is above the predetermined temperature or the speed of the vehicle is above the set speed.

The predetermined temperature may be 450° C. or more and less than 500° C.

The set speed may be 3 km/h.

According to an exemplary embodiment of the present invention, in cold state at the beginning of engine startup, by controlling, by the controller, the air-fuel ratio optimally according to the speed and gear condition of the vehicle, it is possible to effectively remove nitrogen oxides in the exhaust gas.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
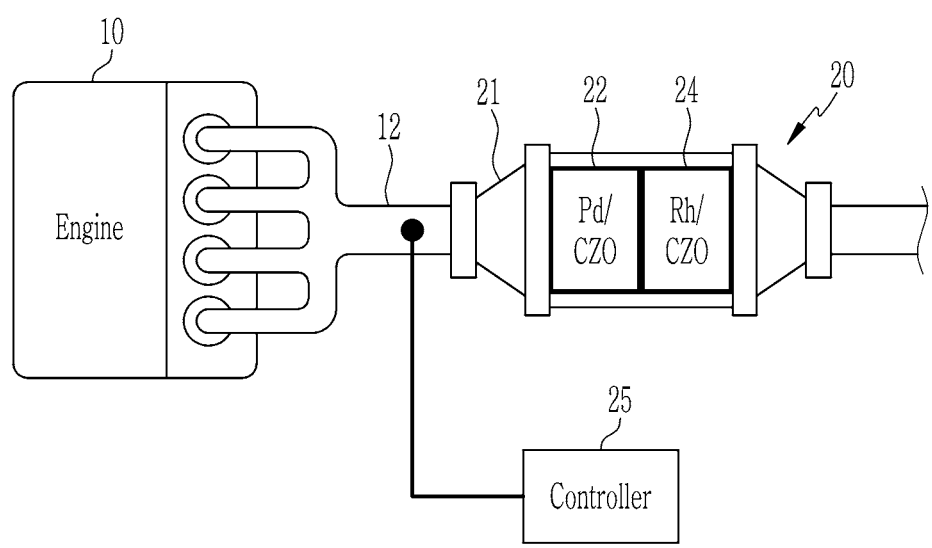
FIG. 1 is a schematic diagram of an exhaust gas purification system for vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Also, to the same structure, element, or component appearing in more than one of the figures, the same reference numerals are used to denote similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment of the present invention is not limited to a specific aspect of the illustrated region, and for example, includes modifications of an aspect by manufacturing.

Now, an exhaust gas purification system according to an exemplary embodiment of the present invention will be described with reference to FIG. 1.

FIG. 1 is a schematic diagram of an exhaust gas purification system for vehicle according to an exemplary embodiment of the present invention.

Referring to FIG. 1, an exhaust gas purification system for vehicle according to an exemplary embodiment of the present invention is provided on an exhaust pipe 12 connected to an exhaust side of an engine 10 for purifying an exhaust gas of the engine 10, and includes a housing 21 mounted on the exhaust pipe 12, a front end catalyst and a rear end catalyst incorporated in the housing 21, and a controller 25 to control the concentration of unburned fuel contained in the exhaust gas flowing into the housing 21. In FIG. 1, a portion of the housing 21 is cut to show the configuration of the front end catalyst 22 and the rear end catalyst 24.

The engine 10 burns air-fuel mixture in which fuel and air are mixed to convert chemical energy into mechanical energy. The engine 10 includes a plurality of combustion chambers for generating a driving force by combustion of fuel, and is connected to an intake manifold to receive the air in a combustion chamber, and is connected to an exhaust manifold such that exhaust gas generated in combustion process is gathered in the exhaust manifold and is expelled to the external. An injector is mounted in the combustion chamber to inject the fuel into the combustion chamber.

The exhaust pipe 12 is connected to the exhaust side of the engine 10 to exhaust the exhaust gas discharged from the engine 10 to the outside. Meanwhile, the exhaust pipe 12 may extend rearward along the under floor of the vehicle to exhaust the exhaust gas to the rear of the vehicle, and the arrangement of the exhaust pipe 12 and the connection with the exhaust side of the engine 10 will be apparent to those skilled in the art (hereinafter, those skilled in the art), so that detailed description thereof will be omitted.

The exhaust gas discharged from the engine 10 passes through the exhaust pipe 12 and passes through the exhaust gas purification system 20. Furthermore, the exhaust gas passing through the exhaust gas purification system 20 passes through the front end catalyst 22 and the rear end catalyst 24 in sequence. That is, the front end portion of the housing 21 is connected to the engine 10 by the exhaust pipe 12 to receive the exhaust gas discharged from the engine 10, and the rear end portion of the housing 21 is connected to the exhaust gas purification system 20 to discharge the exhaust gas passed through the exhaust pipe 12 rearward of the vehicle. Here, the front end portion and the rear end portion of the component refer to the flow of the exhaust gas, and the exhaust gas is defined as flowing from the front end portion to the rear end portion of the component.

The front end catalyst 22 is configured to primarily purify the exhaust gas flowing into the housing 21 through the front end portion of the housing 21. Furthermore, the front end catalyst may be a palladium (Pd) catalyst that oxidizes hydrocarbons (HC) and carbon monoxide (CO) and occludes nitrogen oxides (NOx). Meanwhile, more particularly, the front end catalyst may be a Pd/CZO catalyst in the palladium (Pd) catalyst. Here, CZO, which is a mixed oxide of cerium (Ce) and zirconium (Zr) contained for increasing the efficiency of the Pd catalyst and the Pd catalyst, is obvious to those skilled in the art and thus a detailed description thereof will be omitted.

The rear end catalyst 24 is configured to secondarily purify the exhaust gas passing through the front end catalyst 22 before the exhaust gas flows out to the rear end portion of the housing 21. Furthermore, the rear end catalyst 24 may be a rhodium (Rh) catalyst for reducing nitrogen oxides. Meanwhile, more particularly, the rear end catalyst may be a Rh/CZO catalyst in the rhodium (Rh) catalyst. Here, the Rh catalyst is obvious to those skilled in the art, so a detailed description thereof will be omitted.

The controller 25 is connected to the exhaust pipe 12 at the front end portion of the housing 21 to control the concentration of the unburned fuel contained in the exhaust gas according to temperature of the exhaust gas flowing into the housing 21 and speed of the vehicle.

The controller 25 may detect the temperature of the exhaust gas flowing through the exhaust pipe 12 connected to the front end portion of the housing 21 through a temperature sensor connected to the controller 25, and detect the speed of the vehicle by a speed sensor connected to the controller 25. Furthermore, to collect information related to air-fuel ratio (k), an oxygen sensor connected to the controller 25.

The controller 25 may perform the lean control so that the concentration of the unburned fuel contained in the exhaust gas flowing into the housing after starting the engine 10 becomes fuel lean. The controller 25 controls differently a leanness of the concentration of the unburned fuel contained in the exhaust gas according to temperature of the exhaust gas flowing into the housing and speed of the vehicle.

In an exemplary embodiment of the present invention, the controller 25 is connected to the injector to control the air-fuel ratio $\lambda$ of the unburned fuel contained in the exhaust gas.

The controller 25 controls to terminate the lean control if the temperature of the exhaust gas is above a predetermined temperature T or the speed of the vehicle is above a set speed V.

The controller 25, if the temperature of the exhaust gas is less than the predetermined temperature, and the speed of the vehicle is less than the set speed, may control the air-fuel ratio $\lambda$ of the unburned fuel contained in the exhaust gas flowing into the housing 21 when the gear of the vehicle is in the neutral (N) state to less than 1.08. Here, the predetermined temperature may be about 450° C. or more and less than about 500° C., and the set speed may be about 3 km/h.

Furthermore, the controller 25, if the temperature of the exhaust gas is less than the predetermined temperature T, and the speed of the vehicle is less than the set speed V, may control the air-fuel ratio of the unburned fuel contained in the exhaust gas flowing into the housing 21 when the gear of the vehicle is in the driving (D) state to less than 1.05.

Figure 2:
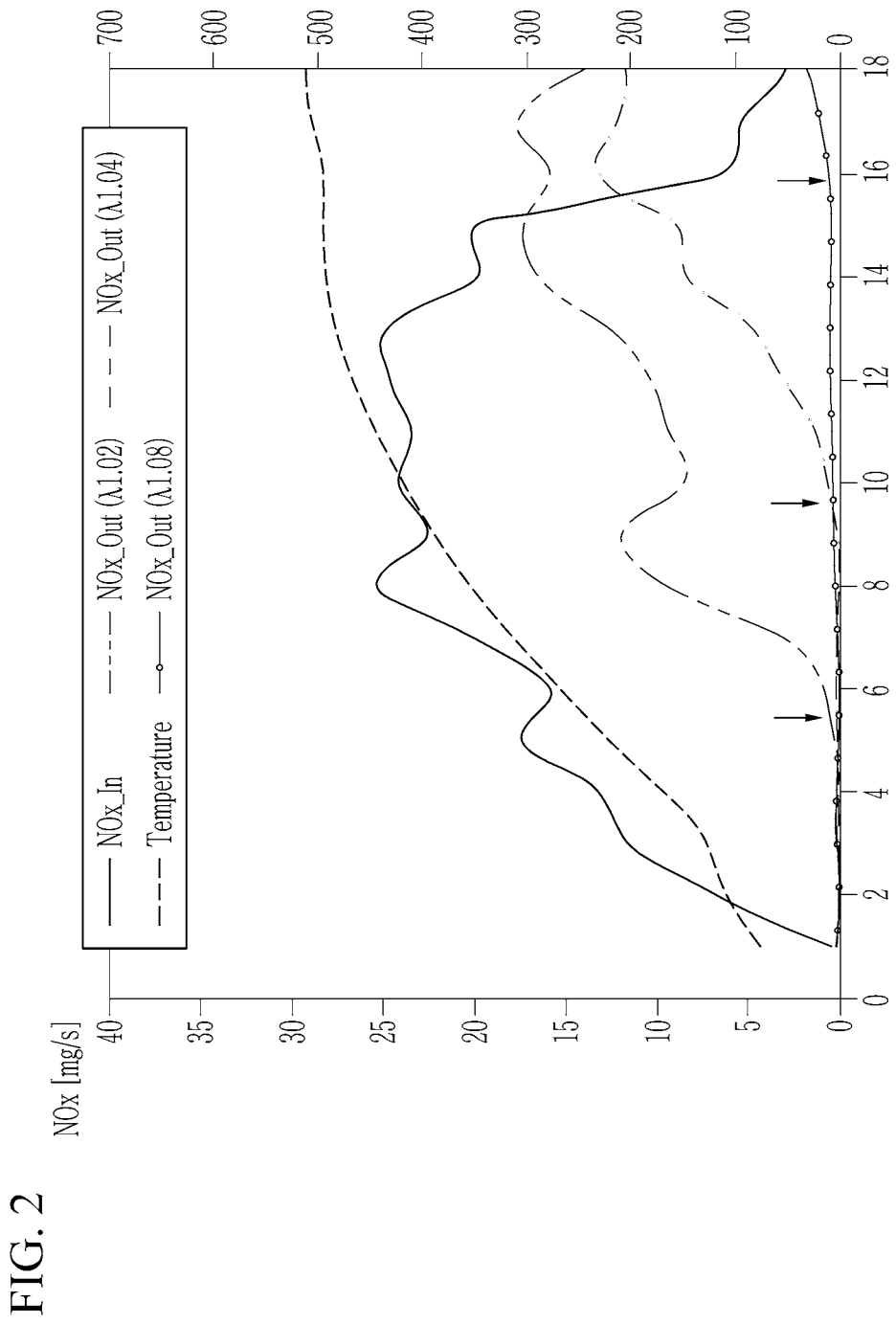
FIG. 2 is a graph showing purification performance of nitrogen oxide according to each air-fuel ratio in case where the exhaust gas purification system for a vehicle according to an exemplary embodiment of the present invention performs lean control in the cold state of the engine.
Figure 3:
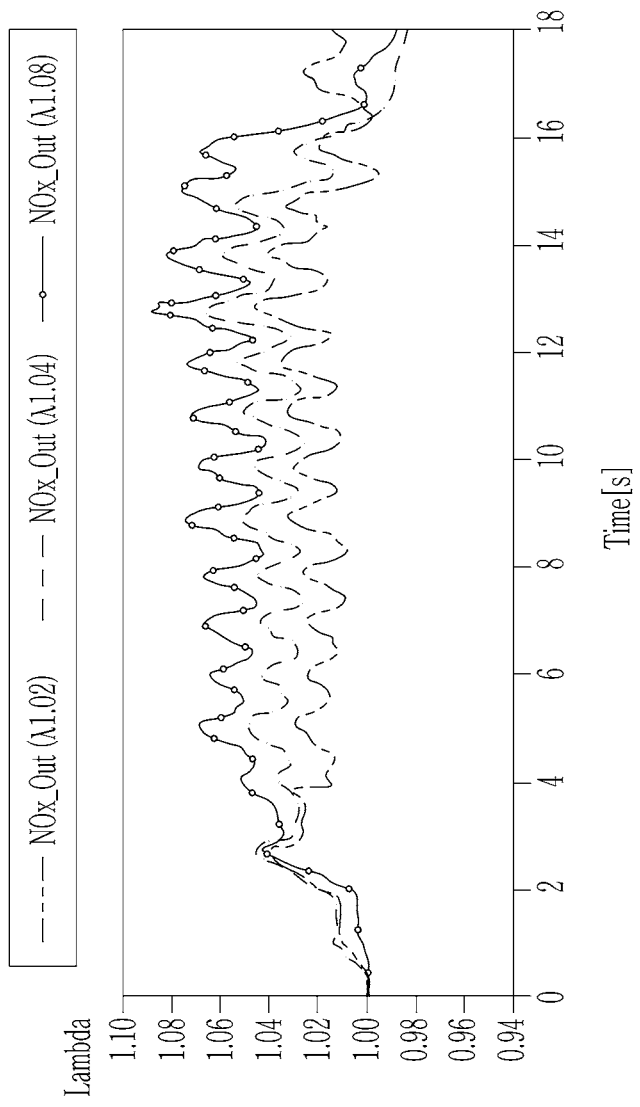
FIG. 3 is a graph showing the change of each air-fuel ratio in case where the exhaust gas purification system for a vehicle according to an exemplary embodiment of the present invention performs lean control in the cold state of the engine.

FIG. 2 is a graph showing purification performance of nitrogen oxide according to each air-fuel ratio in case where the exhaust gas purification system for a vehicle according to an exemplary embodiment of the present invention performs lean control in the cold state of the engine, and FIG. 3 is a graph showing the change of each air-fuel ratio in case where the exhaust gas purification system for a vehicle according to an exemplary embodiment of the present invention performs lean control in the cold state of the engine.

In the graph shown in FIG. 2, the vertical axis represents the concentration of nitrogen oxides (NOx) contained in the exhaust gas, and the horizontal axis represents time. That is, the graph shows the concentration of nitrogen oxides (NOx) contained in the exhaust gas according to the passage of time in the initial cold state after start of the engine 10. In the graph, an exhaust gas temperature rise curve along with the passage of time in the initial cold state after start of the engine 10 is shown together with a dotted line, the change in the concentration (NOx_In) of the nitrogen oxide (NOx) contained in the exhaust gas flowing into the housing 21 is shown by a dashed-dotted line, and when the air-fuel ratio $\lambda$ is 1.02, 1.04, and 1.08, respectively, the change in the concentration (NOx_Out) of the nitrogen oxide (NOx) contained in the exhaust gas flowing out of the housing 21 is shown by the respective lines.

Furthermore, in the graph shown in FIG. 3, the vertical axis represents the air-fuel ratio (λ) of the exhaust gas and the horizontal axis represents time. Each line shown in FIG. 3 represents a case where the air-fuel ratio λ is 1.02, 1.04, and 1.08 from below, respectively, and represents an average value.

The change in the nitrogen oxide concentration shown in the graphs shown in FIG. 2 and FIG. 3 represents the change in the nitrogen oxide (NOx) contained in the exhaust gas flowing out of the housing 21 in the state in which the controller 25 controls the air-fuel ratio λ to 1.02, 1.04, 1.08 under lean control to control the concentration of unburned fuel contained in exhaust gas flowing into the housing 21 under fuel lean conditions. When the air-fuel ratio λ is 1.02, the time for detecting nitrogen oxide (NOx) in the exhaust gas is about 5 seconds after starting the engine, when the air-fuel ratio λ is 1.04, the time for detecting nitrogen oxide (NOx) in the exhaust gas is about 10 seconds after starting the engine, and when the air-fuel ratio λ is 1.08, the time for detecting nitrogen oxide (NOx) in the exhaust gas is about 16 seconds after starting the engine. As shown in FIG. 2 and FIG. 3, as the air-fuel ratio λ is increased during lean control in the cold state at the initial stage of engine 10 startup, the time for detecting nitrogen oxide in the exhaust gas increases, which flows out of the housing 21. It may be seen that the concentration (NOx_Out) of the nitrogen oxide (NOx) contained in the exhaust gas is low. Therefore, it may be confirmed that the exhaust gas purification efficiency is higher as the air-fuel ratio λ is larger at the time of lean control in the cold state at the initial start of the engine 10.

Figure 4:
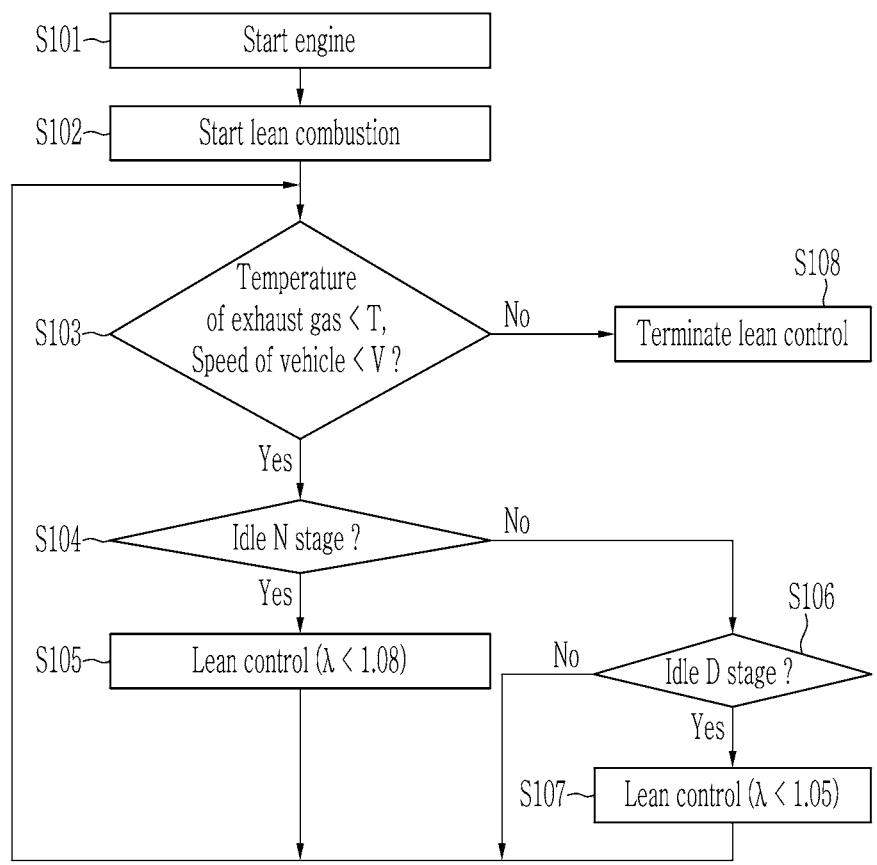
FIG. 4 is a flowchart illustrating a method of controlling an exhaust gas purification system for a vehicle according to an exemplary embodiment of the present invention.

FIG. 4 is a flowchart illustrating a method of controlling an exhaust gas purification system for a vehicle according to an exemplary embodiment of the present invention.

Referring to FIG. 4, a method of controlling an exhaust gas purification system for vehicle according to an exemplary embodiment of the present invention is configured for controlling an exhaust gas purification system for vehicle including a housing 21 mounted on the exhaust pipe 12 to receive the exhaust gas discharged from the engine 10 and to exhaust the exhaust gas passed rearward thereof, a front end catalyst 22 primarily purifying the exhaust gas, a rear end catalyst 24 secondarily purifying the exhaust gas passing through the front end catalyst 22, and a controller 25 connected to the exhaust pipe 12 at a front end portion of the housing 21 to control the concentration of unburned fuel contained in the exhaust gas according to temperature of the exhaust gas flowing into the housing 21 and speed of the vehicle, and the method firstly includes starting the engine S101. Furthermore, with or immediately after starting the engine 10, lean control to control the concentration of the unburned fuel contained in the exhaust gas flowing into the housing 21 to be fuel lean is performed by the controller 25 S102. Here, the lean control is preferably such that the lowest air-fuel ratio λ is maintained at 1.03 or more. Furthermore, the leanness of the concentration of unburned fuel contained in the exhaust gas is controlled differently according to the temperature of the exhaust gas and the speed of the vehicle.

While the lean control is performed, the controller 25 determines whether the temperature of the exhaust gas flowing into the housing 21 is lower than the predetermined temperature T, and determines whether the speed of the vehicle is lower than the set speed V S103. Here, the predetermined temperature may be about 450° C. or more and less than about 500° C. Furthermore, the set speed may be about 3 km/h.

If the temperature of the exhaust gas flowing into the housing 21 is lower than a predetermined temperature T and the speed of the vehicle is lower than a set speed V, lean control continues. That is, the lean control is maintained while the engine 10 is determined to be in the cold state at the start of startup. If the temperature of the exhaust gas inflowing into the housing 21 is above the predetermined temperature T or the speed of the vehicle is above the set speed V, the lean control is terminated S108.

While the lean control is maintained, the controller 25 determines the gear state of the vehicle S104 and S106.

The controller 25 controls the air-fuel ratio λ of the unburned fuel contained in the exhaust gas flowing into the housing 21 if the gear of the vehicle is in the neutral (N) state to less than 1.08 S104 and S105. Furthermore, the controller 25 controls the air-fuel ratio λ of the unburned fuel contained in the exhaust gas flowing into the housing when the gear of the vehicle is in the driving (D) state to less than 1.05 S106 and S107. Since the optimum air-fuel ratio λ level that ensures combustion stability differs depending on the gear condition of the vehicle, as the gear state is neutral (N) and traveling (D) state, the air-fuel ratio λ is controlled to less than 1.08 and less than 1.05, respectively.

Like this, according to an exemplary embodiment of the present invention, in cold state at the beginning of engine startup, by controlling, by the controller, the air-fuel ratio optimally according to the speed and gear condition of the vehicle, it is possible to effectively remove nitrogen oxides in the exhaust gas.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An exhaust gas purification system mounted on an exhaust pipe connected to an exhaust side of an engine of a vehicle for purifying an exhaust gas of the engine, the system comprising:
   a housing mounted on the exhaust pipe to receive the exhaust gas discharged from the engine and to exhaust the exhaust gas rearward of the housing;
   a front end catalyst incorporated in the housing to purify the exhaust gas flowing into the housing through a front end portion of the housing;

a rear end catalyst incorporated in the housing and disposed in a rear of the front end catalyst to purify the exhaust gas passing through the front end catalyst before the exhaust gas flows out to a rear end portion of the housing; and a controller configured to control a concentration of unburned fuel contained in the exhaust gas according to a temperature of the exhaust gas flowing into the housing and speed of the vehicle, wherein the controller is configured to perform lean control to control the concentration of the unburned fuel contained in the exhaust gas flowing into the housing to be fuel lean after start of the engine, and to control differently a leanness of the concentration of the unburned fuel contained in the exhaust gas according to the temperature of the exhaust gas flowing into the housing and the speed of the vehicle.

2. The exhaust gas purification system of claim 1, wherein the front end catalyst is a palladium (Pd) catalyst that oxidizes hydrocarbons and carbon monoxide and occludes nitrogen oxides.

3. The exhaust gas purification system of claim 2, wherein the front end catalyst is a Pd/CZO catalyst.

4. The exhaust gas purification system of claim 1, wherein the rear end catalyst is a rhodium catalyst for reducing nitrogen oxides.

5. The exhaust gas purification system of claim 4, wherein the rear end catalyst is a Rh/CZO catalyst.

6. The exhaust gas purification system of claim 1, wherein the controller is configured to control to terminate the lean control upon determining that the temperature of the exhaust gas is above a predetermined temperature or the speed of the vehicle is above a predetermined speed.

7. The exhaust gas purification system of claim 6, wherein the predetermined temperature is 450° C. or more and less than 500° C.

8. The exhaust gas purification system of claim 6, wherein the predetermined speed is 3 km/h.

9. The exhaust gas purification system of claim 6, wherein the controller, upon determining that the temperature of the exhaust gas is less than the predetermined temperature, and the speed of the vehicle is less than the predetermined speed, is configured to control air-fuel ratio of the unburned fuel contained in the exhaust gas flowing into the housing upon determining that a gear state of the vehicle is in a neutral (N) state to less than 1.08.

10. The exhaust gas purification system of claim 9, wherein the controller is configured to control the air-fuel ratio of the unburned fuel contained in the exhaust gas flowing into the housing upon determining that the gear state of the vehicle is in a driving (D) state to less than 1.05.

11. A method of controlling an exhaust gas purification system including a housing mounted on an exhaust pipe to receive an exhaust gas discharged from an engine of a vehicle and to exhaust the exhaust gas rearward of the housing, a front end catalyst purifying the exhaust gas, a rear end catalyst disposed at a rear of the front end catalyst and purifying the exhaust gas passing through the front end portion catalyst, and a controller configured to control a concentration of unburned fuel contained in the exhaust gas according to a temperature of the exhaust gas flowing into the housing and speed of the vehicle, the method comprising:

performing, by the controller, lean control to control the concentration of the unburned fuel contained in the exhaust gas flowing into the housing to be fuel lean;

determining, by the controller, when the temperature of the exhaust gas flowing into the housing is lower than a predetermined temperature and the speed of the vehicle is lower than a predetermined speed;

determining, by the controller, a gear state of the vehicle, upon determining that the temperature of the exhaust gas flowing into the housing is lower than the predetermined temperature and the speed of the vehicle is lower than the predetermined speed; and controlling, by the controller, an air-fuel ratio of the unburned fuel contained in the exhaust gas flowing into the housing upon determining that the gear state of the vehicle is in a neutral (N) state to less than 1.08.

12. The method of controlling the exhaust gas purification system of claim 11, further including controlling, by the controller, the air-fuel ratio of the unburned fuel contained in the exhaust gas flowing into the housing upon determining that the gear state of the vehicle is in a driving (D) state to less than 1.05.

13. The method of controlling the exhaust gas purification system of claim 11, further including controlling to terminate the lean control upon determining that the temperature of the exhaust gas inflowing into the housing is above the predetermined temperature or the speed of the vehicle is above the predetermined speed.

14. The method of controlling the exhaust gas purification system of claim 11, wherein the predetermined temperature is 450° C. or more and less than 500° C.

15. The method of controlling the exhaust gas purification system of claim 11, wherein the predetermined speed is 3 km/h.

16. The method of controlling the exhaust gas purification system of claim 11, wherein the front end catalyst is a palladium (Pd) catalyst that oxidizes hydrocarbons and carbon monoxide and occludes nitrogen oxides.

17. The method of controlling the exhaust gas purification system of claim 16, wherein the front end catalyst is a Pd/CZO catalyst.

18. The method of controlling the exhaust gas purification system of claim 11, wherein the rear end catalyst is a rhodium catalyst for reducing nitrogen oxides.

19. The method of controlling the exhaust gas purification system of claim 18, wherein the rear end catalyst is a Rh/CZO catalyst.

* * * * *